July 5, 1960     H. W. THATCHER     2,943,646
PICKER STICK CONNECTING MEANS
Filed Oct. 2, 1958
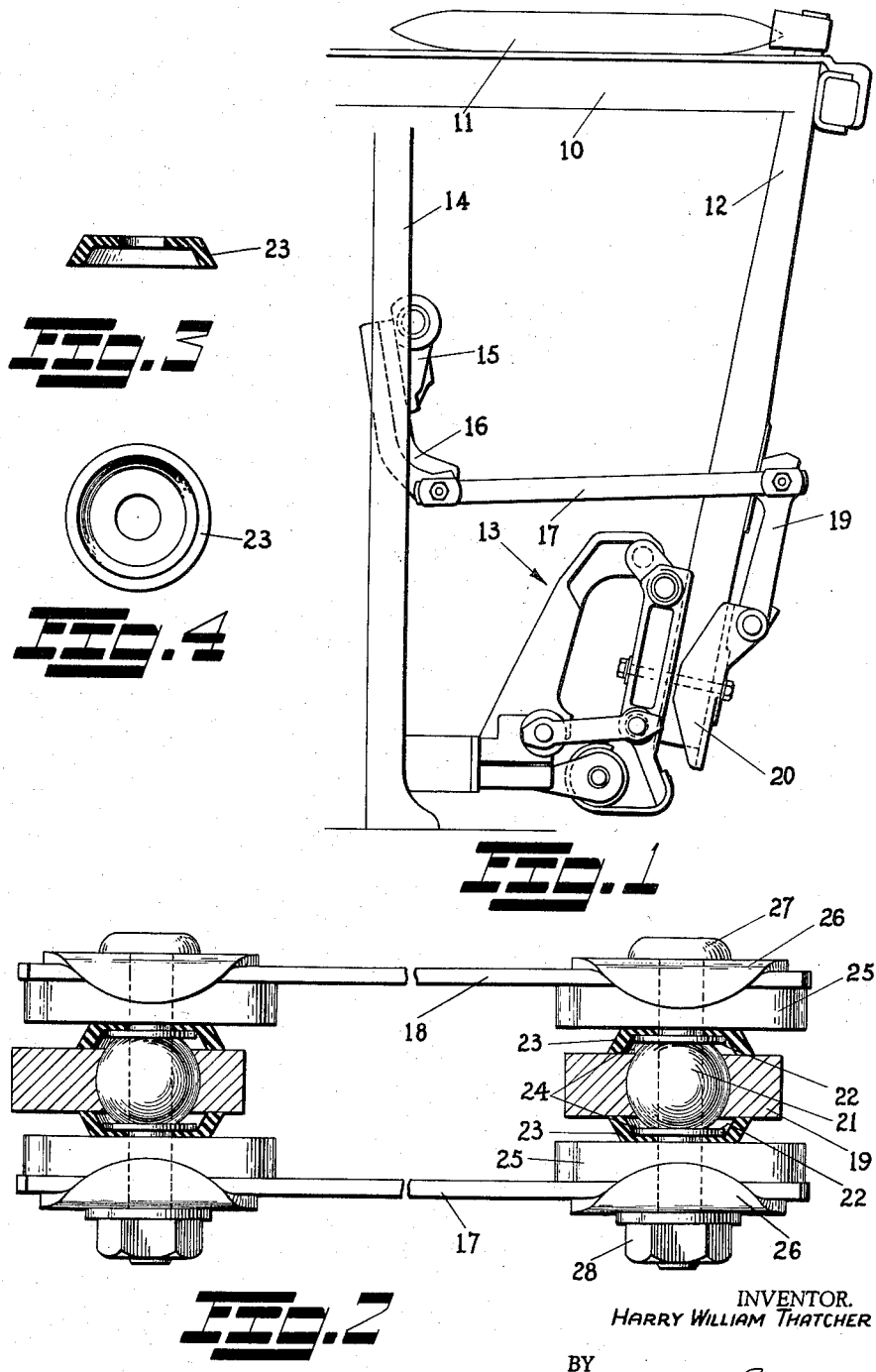
INVENTOR.
HARRY WILLIAM THATCHER
BY
*Rodney C. Southworth*
ATTORNEY

United States Patent Office 2,943,646
Patented July 5, 1960

2,943,646

PICKER STICK CONNECTING MEANS

Harry William Thatcher, Mendon, Mass., assignor to Draper Corporation, Hopedale, Mass., a corporation of Maine Filed Oct. 2, 1958, Ser. No. 764,793

5 Claims. (Cl. 139—151)

This invention relates to pick motions for looms and, more particularly, to a power block for transmitting motion from the pick arm to the picker stick of a fly shuttle type loom.

It is a general object of this invention to provide lug connection means for the power block of a loom which utilizes ball and socket joints, which have long life and remain in adjustment, in place of sliding limited couplings of flexible material which resulted in cornering and bending loads and in excessive wear which necessitated periodic adjustment to maintain proper timing of motion, and which lug connections comprise a lightweight structural material to reduce dynamic flutter encountered with the use of heavy elastic materials, and wherein means is provided to effect stabilization of the lug connection means.

It is a further object of this invention to provide a lug connection for a picker stick for such looms which comprises substantially rigid lug link side members interconnected to the motion transmission means for the picker stick by means of ball and socket type universal members wherein means is provided for keeping vibration at a minimum, which means further serves as a grease seal and also as a centering device or stabilizer to prevent damage to the spherical bearings due to impacts at the limits of the angular and rolling motions of the link members.

Further objects will appear from the detailed description which follows.

Lug connecting means of the prior art which utilize ball and socket type universal connecting means suffer from the disadvantage that they are noisy during operation, they are subject to continual vibration and shock, and they are very unstable due to the forces imparted to them in both lateral and longitudinal directions. Accordingly, the life of these connecting means and that of the picker stick and other associated mechanism have been greatly shortened.

This invention overcomes these objectionable features by providing a lug connection including a resilient cup-shaped stabilizing member which is effective to overcome all these disadvantages of the prior art.

The invention may be more completely understood by reference to the accompanying drawing, wherein:

Fig. 1 is a front elevation of a part of a loom including the power block mechanism and picker stick;

Fig. 2 is a plan view of the lug connection, partly in section, showing the relationship between the cup-shaped stabilizing member and the ball and socket bearing;

Fig. 3 is a cross section of the stabilizing member used in this invention;

Fig. 4 is a plan view of the stabilizing member looking into the cup portion.

In Fig. 1 the loom lay is shown at 10 carrying a shuttle 11. A picker stick 12 is used to impart motion to the shuttle to carry it across the lay and a parallel motion means such as that shown at 13 is used to assure that the top of the picker stick traverses a path which is parallel to the top surface of the lay. Such a device forms no part of the instant invention and for a more detailed explanation of this parallel motion reference may be had to U.S. Patent Number 2,575,456. Of course, other types of parallel motions may be used instead, such as the well known "shoe type" or a simple pivoted stick with a slide picker.

On the right side 14 of the loom there is mounted a pick shaft 15 to which is affixed a pick arm 16. The latter is connected in a manner to be described in more detail hereinafter to one end of a pair of rigid lug link side members or lug connections 17, 18 which are preferably formed either of 4-ply laminated hickory or of wrought aluminum although other materials may be used. At their other end the lug link sides are connected, as at their opposite end, to a power block link 19, which is pivoted at its opposite end to a picker stick washer 20 fixed to the lower end of the picker stick.

In Fig. 2 the connections at either end of the lug link side members are shown as being identical and thus an explanation of one will be sufficient. The power block link 19, which is preferably of aluminum, may be cast with a steel ball bearing 21 integral therewith after which the latter is loosened so that it may revolve in a manner well known in the art. A hole is then drilled through the steel ball and the connection is assembled by placing steel washers 22 on either side of the ball bearing. A cup-shaped stabilizing member 23, formed of a resilient material, preferably of polyurethane rubber, is placed in the manner shown in Fig. 2 adjacent each washer forming an annular pocket 24 between the seal and the link 19. The polyurethane or other resilient material to be used should preferably be of such hardness as to show a durometer reading of 40 to 90 on the A scale for best results. Lug link spacers 25 of cast aluminum provide sufficient clearance for insertion of the picker stick between the lug link sides 17 and 18 which are held in place by clamping members 26 and a bolt 27 and nut 28.

In operation, grease is inserted into the pockets 24 and retained therein by the stabilizing members. Lateral movement of the power block assembly during running of the loom results in lateral angular displacement between the link member 19 and its associated members. However, this displacement is continually opposed by the stabilizing members which tend to return the link 19 to a position wherein its sides are parallel to the faces of the spacers and to the faces of the lug link sides 17 and 18. Vibrational effects are reduced to a minimum due to limitation of angular displacement of parts and separation of certain of the parts by the resilient members.

While one embodiment of the invention has been disclosed, it is to be understood that the inventive concept may be carried out in a number of ways. This invention is, therefore, not to be limited to the precise details described, but is intended to embrace all variations and modifications thereof falling within the spirit of the invention and the scope of the claims.

I claim:

1. In a pick motion for the picker stick of a loom, a lug connection comprising a pair of substantially rigid parallel lug link side members having a connection at one end thereof to a pick arm and at the other end to a positioning means at the stick, each said connection including a ball and socket type universal connecting means and means for stabilizing said lug connection which comprises resilient cup-shaped members, one at each side of each connecting means, each of said cup-shaped members defining an enclosed pocket adjacent said ball and socket connecting means.

2. The lug connection of claim 1 wherein said resilient members have outwardly tapered sides forming said pocket.

3. The lug connection of claim 1 wherein the connection at said other end is to a pivoted link member and said ball has a passage therethrough for a clamping means.

4. The lug connection of claim 1 wherein said resilient member is formed of polyurethane and said link members are of wood.

5. The lug connection of claim 1 wherein said resilient member is formed of polyurethane and said link members are of aluminum composition.

References Cited in the file of this patent

UNITED STATES PATENTS

| | | |
|---|---|---|
| 730,743 | Campbell | June 9, 1903 |
| 1,989,116 | Strauss | Jan. 29, 1935 |
| 2,308,613 | Le Tourneau | Jan. 19, 1943 |
| 2,601,875 | Dardani | July 1, 1952 |
| 2,633,156 | Mastriani et al. | Mar. 31, 1953 |